United States Patent Office 2,824,092
Patented Feb. 18, 1958

2,824,092

PROCESS OF PREPARATION OF A GELATIN-CARBOXYMETHYL CELLULOSE COMPLEX

Robert E. Thompson, Chicago, Ill.

No Drawing. Application January 4, 1955
Serial No. 479,869

2 Claims. (Cl. 260—117)

This invention relates to artificial mucoid substances, and more particularly to glycoprotein produces having unique properties and to methods for preparing such products.

The naturally occurring conjugated proteins, which consist of a protein molecule complexed with a non-protein molecule, are important substances in vegetable and animal metabolism. One class of these conjugated proteins is termed the glycoproteins, and is more commonly described as the mucoids, which are substances having properties similar to mucin. The glycoproteins consist of a complex of a protein and a carbohydrate. In relatively recent years these glycoproteins have been isolated from certain animal sources and purified to provide certain industrial products. The usual animal sources employed in manufacturing these products are mammalian tendons and bones; most often the source of mucin has been the mucus lining of the digestive tract in mammals. The product obtained from this mucosa is generically termed mucin and is identified according to simple physical determinations such as viscosity and water solubility. It is most difficult to purify the mucins derived from animal sources in that they are naturally associated with the non-mucin proteins having similar solubility and reactive properties. In addition, the purified natural mucins are integrally contaminated with unpalatable substances and are consequently unsuited to edible uses. However, the most undesirable feature of the natural mucins is that they are closely related in chemical structure and properties. Thus, it is most difficult to isolate a natural mucin having a molecular size, viscosity or solubility suitable for particular uses. Consequently, the fields of employment for these natural mucins is extremely limited, and a more versatile product is desired in modern industry.

An object of this invention is to provide methods of preparing glycoproteins having a variety of physical properties and consequent versatile employment in industry. Another object of this invention is to provide mucin products suitable generally for edible uses, and more particularly to pharmaceutical utilization. In addition, it is a general object of this invention to provide methods of combining a variety of protein molecules with a variety of polysaccharide molecules to provide a number of products having novel and useful properties.

In one aspect of the present invention, a glycoprotein can be formed as a complex including an oxidized or oxygenated polysaccharide component and a proteinaceous component. This glycoprotein can be obtained by mixing an oxidized or oxygenated polysaccharide material and a proteinaceous substance in aqueous medium, and then separating the resulting protein-polysaccharide complex from the supernatant liquid. This complex can be obtained as a substantially water-immiscible aqueous equilibrium gel, which equilibrium structure can be demonstrated by the fact that prolonged centrifugation does not alter the water-glycoprotein ratio of the gel. This aqueous glycoprotein gel can be reduced to the dry state to more conveniently store and transport the product. This dehydrated glycoprotein product has considerable tensile strength, while being brittle, and can be prepared in such forms as films, blocks and sheets. The dried glycoprotein reverts to the water-immiscible gel form upon contact with water. These glycoprotein substances are bland and tasteless, unlike the natural mucins, and consequently can be suitably included in edible products.

In one method of preparing the glycoprotein of this invention, an oxidized or oxygenated polysaccharide material and a proteinaceous substance can be combined in an aqueous reaction mixture having a pH of from about 3.5 to 6.5. Better results are obtained when the pH of this mixture is about 4.5 to 5.5, and especially desirable results are obtained at about pH 5.0. If desired, the reaction mixture may be agitated, employing such agitation methods as stirring, pumping and churning, to increase the surface contact between the aqueous medium and the reactive substances. When the carbohydrate-protein reaction product has been formed, water is combined with the reaction mixture in such volume as to precipitate the glycoprotein product as a subnatant phase in the aqueous medium. Suitably, the precipitating water can be mixed with the reaction mixture by continuous addition until the desired precipitate or subnatant phase is formed. Usually, the volume of precipitating water required in the process is at least about three fourths of the volume of the reaction mixture to produce formation of this precipitate, i. e. A volume of precipitating water of at least about 0.75 cc. per cc. of reaction mixture may be employed in precipitating the carbohydrate-protein complex. However, the volume of precipitating water can be from about 1 to 3 cc. per cc. of reaction mixture, and suitably about 2 cc. of precipitating water per cc. of reaction mixture. After combining the precipitating water with the reaction mixture to form the glycoprotein precipitate, it is desirable to permit the aqueous system to achieve an equilibrium condition. This equilibrium condition can be obtained by settling the liquid in a suitable stand-tank. Thereafter, the precipitated glycoprotein phase can be separated from the supernatant liquid by various methods, such as decantation, filtration and centrifugation. The product obtained is an equilibrium gel which can be converted to the dried pulverulent product. If the dehydrated product is to be produced, the aqueous gel material can be dried by such methods as lyophilization and spray-drying.

Any oxidized or oxygenated polysaccharide can be combined with any proteinaceous substance to form the glycoprotein complex of this invention. The oxidized or oxygenated polysaccharide component of this glycoprotein complex may be of vegetable, animal and bacterial origin. Also, this polysaccharide component may be of either the structural or nutrient type. Thus, the polysaccharide component of this complex may be an oxidized or oxygenated derivative of such vegetable nutrient polysaccharides as starches, e. g. amylose and amylopectin, and inulins; such vegetable structural polysaccharides as celluloses, e. g. carboxymethyl cellulose and oxycellulose, xylans, pectins and algins; such animal polysaccharides as glycogens, chitins and mucopolysaccharides, e. g. chondroitin sulfuric acid, heparin and hyaluronic acid; and such bacterial polysaccharides as levans and dextrans. It will be understood that the term oxidized or oxygenated polysaccharide includes such compounds as polysaccharinic acids or carboxylated polysaccharides and carboxyhydrocarbon derivatives of polysaccharides, e. g. carboxyalkyl substituted polysaccharides. The term proteinaceous substance employed herein refers to such derived proteins as proteoses, peptones and polypeptides, as well as whole proteins. The protein component of this glycoprotein complex may be any of such proteinaceous substances. As proteinaceous substances suitable for inclusion in this complex I mention, for example, gelatin, albumin, casein, globulins, collagen, derivatives of these whole proteins, and hydrolytic products thereof.

The concentration and ratio of the oxidized or oxygenated polysaccharide and proteinaceous substance in the aqueous reaction mixture, and the conditions under which the glycoprotein products are produced, may be varied widely. With reference to the concentration and ratio of reactants, it has been found that when an excess of either the polysaccharide or protein material is employed in the reaction mixture, i. e., an excess of the reactants over the combining ratio thereof under the reaction conditions, such excess is dissolved in the aqueous mixture and is eliminated from the reaction product in the step of separating the aqueous gel from the supernatant liquid. Also, any water-soluble contaminants of the reactant substances, as well as those water-soluble contaminants included in the reaction mixture, may be separated from the reaction product in this step. The efficiency and yield of the glycoprotein complex is susceptible to such interrelated conditions as pH, temperature, concentration of reactants, ratio of reactants and volume of precipitating water according to well known chemical reactivity phenomena. For example, when the temperature of the reaction mixture is decreased, and other conditions are constant, the glycoprotein is more insoluble therein and less precipitating water is required to obtain separation thereof from the supernatant phase. Also, as the pH of the aqueous gel product is made more alkaline than the pH of its formation, while other conditions are constant, the amount of water contained in such gel under equilibrium conditions is increased. Further, when the pH of this product is altered to the alkaline side of neutrality it becomes miscible with water. Generally, it can be said that as the pH of the reaction mixture is made more alkaline, while other conditions are maintained constant, a greater concentration of reactants therein is required to produce the same yield of glycoprotein. This effect may be compensated, for example, by decreasing the temperature of such mixture.

I have tested the glycoprotein products of this invention pharmacologically and found them to be substantially non-antigenic and substantially non-toxic upon parenteral administration. Consequently, the product is useful not only in producing edible materials but also in providing substances suitable for intravenous and intramuscular injection. Some of the physical properties of these glycoproteins which indicate their usefulness are viscosity, molecular size, and gel point. A glycoprotein of greater molecular size can be obtained by employing in its preparation a polysaccharide of higher molecular weight. The viscosity of a glycoprotein may be increased by utilizing in the production thereof a polysaccharide of greater viscosity. Also, the gel point of a glycoprotein can be increased by employing in the preparation thereof a proteinaceous substance having a higher gel point. I have also found that these glycoprotein products react with basic substances to provide complex products. We mention, for example, such organic basic substances which complex with the glycoprotein as protamine, insulin, adrenocorticotrophic hormone and growth hormone. Also, such metallic ions as zinc, aluminum and iron may be combined with the glycoprotein to obtain a complex thereof. Thus ionizable substances of either the organic or inorganic type form complexes with these glycoprotein products.

The following examples will serve further to illustrate the preferred methods and compositions of this invention.

*Example I*

The following method was employed in preparing a glycoprotein product: An aqueous solution of partially hydrolized gelatin at a concentration of 16%, containing 0.5% phenol, in the amount of 67 cc. was mixed with 34 cc. of an aqueous solution containing 3% carboxymethyl cellulose (CMC), low viscosity, type 70 premium grade, with 0.5% phenol. This mixture was stirred vigorously to insure adequate contact between the gelatin and carboxymethyl cellulose, and such mixture was nearly transparent at pH 5.0. 25 cc. of the reaction mixture was mixed with 25 cc. of distilled water while undergoing constant agitation. Upon permitting the aqueous mixture to attain an equilibrium condition a heavy, pearly precipitate was obtained. An additional 50 cc. of water was combined with the mixture, but the precipitate was still present. Then the mixture was held for a period of one hour in the refrigerator at a temperature of about 0 to 6° C. Thereupon the precipitate settled to a volume of about 13 cc. The supernatant liquid did not gel during the refrigeration step which indicates that a major portion of the gelatin was involved in the formation of the precipitate. Furthermore, a complex between the acid carbohydrate and at least a portion of the gelatin was indicated because both reactants, i. e. CMC and gelatin, are miscible with water in nearly all proportions at pH 5.0 and below.

The volume of precipitate (13 cc.) appeared as a cloudy, viscous liquid at room temperature. The precipitate was separated from the supernatant liquid by decantation, and the subnatant phase (precipitate) was centrifuged at a speed of 1,800 R. P. M. for ten minutes. A small volume of aqueous solution was separated into the supernatant phase thereby, and the viscous subnatant phase became more clear. This supernatant phase was decanted, and the subnatant layer was centrifuged for an additional twenty minutes. No further supernatant phase was obtained. Thus, the product obtained was a carbohydrateprotein complex at equilibrium with water. Its viscosity, lubricating properties and water immiscibility were determined. The aqueous glycoprotein product was found to have a suitable viscosity for convenient "syringeability" in an ordinary hypodermic syringe, i. e. a syringe having a number 18 to 24 gauge needle.

This glycoprotein product, having a thixotropic type of viscosity, was found to be non-antigenic, water immiscible and amphoteric.

*Example II*

The viscous liquid glycoprotein product prepared by the method of Example I was found to contain approximately 0.2% phenol and some soluble constituents. Therefore, the product was further purified by washing with water to remove these water-eluable materials.

*Example III*

The viscous liquid glycoprotein product prepared according to the method of Example I was dehydrated by lyophilization. The dried product was found to be susceptible to comminution to produce a pulverized material having a desired particle size, which pulverized material was found to revert to the water immiscible gel form when contacted with water. This dried product, which is tough but brittle, can be prepared in various forms such as films and blocks.

*Example IV*

A purified glycoprotein product was prepared by the following method, wherein the listed ingredients were combined in a suitable mixing vessel:

150 cc. of an aqueous solution containing 4% of carboxymethyl cellulose, type 70, low viscosity premium grade.

200 cc. of an aqueous solution containing 16% of partially hydrolized gelatin with 0.5% phenol.

After the addition of 2.0 cc. of 10% phosphoric acid to the mixture, while undergoing vigorous agitation, a binary system was formed consisting of a viscous liquid subnatant phase and a supernatant liquid phase. The viscous phase was separated from the supernatant phase, and a volume of 250 cc. of this viscous phase was recovered. This viscous phase was centrifuged, and an additional small volume of supernatant liquid was separated and discarded.

The liquid product was extremely viscous but could be drawn into a syringe thru a number 13 needle. Two vials were filled with this product in the amount of 10 cc. per vial. These vials were sealed and then autoclaved at a pressure of 15 pounds for a period of 15 minutes.

The autoclaved product, while still being immiscible with water, was somewhat less viscous than the unheated product.

*Example V*

A jelly-like glycoprotein product, in equilibrium with water, was prepared by the following method: A low viscosity, type 70 premium grade carboxymethyl cellulose material was dissolved in water, in the amount of 3%, and 0.5% phenol was combined with the resulting aqueous solution. A partially hydrolized gelatin material was dissolved in water, in the amount of 16%, and 0.5% phenol was combined therewith.

150 cc. of the aqueous carboxymethyl cellulose solution was mixed with 300 cc. of the aqueous gelatin solution in a suitable vessel. 900 cc. of distilled water was combined with this mixture while undergoing vigorous agitation. The resulting mixture was allowed to stand for a period of about one hour until an equilibrium condition had been obtained whereby the reaction product formed a liquid layer subnatant to the aqueous solution.

The supernatant layer was separated therefrom by decantation, and the subnatant phase was obtained in a volume of 225 cc. This subnatant phase was centrifuged at a speed of 1800 R. P. M. for a period of fifteen minutes, and a small volume of supernatant liquid was separated and discarded.

The centrifuged glycoprotein material was filled into 20 cc. vials, and the vials were sealed. These sealed vials were autoclaved at a pressure of 15 pounds for a period of fifteen minutes. The resultant product, upon cooling to room temperature, was still viscous and water immiscible. The viscosity of the product was suitable for employment with ordinary syringes and needles.

This liquid product was found to be an excellent lubricant, and was also found to produce a glossy surface when applied to paper as a size material and dehydrated.

This product was also found to be non-toxic and non-irritating to animals in subcutaneous doses of about 1.0 cc. per kilogram of animal body weight.

*Example VI*

Glycoprotein products having various gel points were prepared by the following method:

(1) 32.0 grams U. S. P. gelatin, 250 Bloom test, was mixed with 176 cc. of water, and the resulting mixture was liquified by heating to about 70° C.

(2) 3.0 grams of carboxymethyl cellulose type 70 low viscosity, i. e. a low viscosity CMC having an average number of 0.7 carboxymethyl groups substituted in each anhydroglucose unit of the cellulose molecule, was dissolved in 100 cc. of water and heated to a temperature of about 70° C.

(3) The solution obtained in step 2 above was combined with the solution of step 1 in a suitable vessel, and 900 cc. of water at a temperature of 70° C. was combined therewith and mixed thoroughly.

(4) The resulting mixture was allow to stand for a period of one hour in a cylinder, and thereupon the viscous liquid glycoprotein layer settled. The supernatant liquid was decanted, and the subnatant material was centrifuged at a speed of 1800 R. P. M. for a period of fifteen minutes. The small amount of additional supernatant liquid obtained was separated and discarded.

(5) The warm, liquid glycoprotein material was filled into vials in the amount of 10 cc. per vial, and the vials were sealed. The liquid glycoprotein material formed a solid gel upon cooling to room temperature.

(6) The vialed glycoprotein product was subjected to a heat-stability treatment, and the results obtained were as follows:

*a.* The unautoclaved product, or control, gelled at room temperature as hereinbefore described.

*b.* One vial of the glycogelatin product was autoclaved at a pressure of fifteen pounds for a period of fifteen minutes. This product also gelled at room temperature, but more slowly. In the warm liquid state it was less viscous than product obtained in *a* above.

*c.* A second vial of the glycoprotein material was autoclaved twice at a pressure of fifteen pounds for a period of fifteen minutes, i. e. the vial was subjected to two autoclaving cycles. This autoclaved product was less viscous than product *b*, and gelled at a lower temperature than that product.

*d.* A third vial of the glycoprotein product was thrice autoclaved at a pressure of fifteen pounds for a period of fifteen minutes. This product was less viscous than product *c*, and remained in a liquid state at room temperature. It had a viscosity suitable for passage thru a number 18 to 22 syringe needle.

There was no detectable color change due to the autoclaving step in any of the above preparations. Furthermore, all the products, i. e. *a, b, c,* and *d*, were found to be excellent lubricants in the liquid state, and were bland and tasteless.

These products have properties suitable for the preparation of glue, and make excellent suspending agents. In addition, they are suitable for inclusion in certain food products such as puddings and gelatin type desserts.

*Example VII*

The water-miscibility, and the effect thereupon of increased water concentration and base was determined, as follows: A liquid glycoprotein product was prepared according to the method of Example I, in the amount of 50 cc. This product was just perceptibly cloudy after several days storage at room temperature in 10 cc. vials.

To one 10 cc. vial was added 1.0 cc. of water and, upon mixing, the resultant material resumed its original clarity. An additional 1.0 cc. of water was combined with the previously diluted product, and the resulting mixture was very cloudy. Thus the limit of water miscibility for the product was illustrated.

To a second 10 cc. vial of the glycoprotein product was added 1.0% of crystalline trisodium phosphate to produce a material having a pH of 6.0 to 6.5. Thereafter, 5.0 cc. of water was combined with the material, and it was found to remain clear after thorough mixing. This product also was less viscous than the original material.

*Example VIII*

A glycoprotein product having a low gel point and high viscosity was prepared by the following method: An aqueous solution containing 16% of partially hydrolized gelatin in combination with 0.5% phenol was prepared. In addition, a 1% aqueous solution of high viscosity CMC was prepared, containing 0.5% phenol. 50 cc. of the aqueous gelatin solution was combined with 25 cc. of the aqueous CMC solution, and after vigorous agitation in a suitable vessel the mixture was allowed to stand for a period of two hours.

The settled layer thereupon formed was separated from the supernatant phase by decantation, and the subnatant layer was centrifuged for a period of fifteen minutes at a speed of 1800 R. P. M. The resulting product was very viscous and water-immiscible. Its viscosity and other physical properties could be reasonably compared to that of an oyster.

5 cc. of the resulting glycoprotein product was filled into a vial by employing a syringe having a 13 gauge needle, and the vial was sealed. The sealed vial was autoclaved at a pressure of fifteen pounds for a period of fifteen minutes. The autoclaved product was too viscous to pour but could be drawn into a syringe through a 13 gauge needle and extruded.

*Example IX*

A glycoprotein product having an intermediate viscosity and low gel point was prepared by the following method: This product was prepared according to the method of Example VIII excepting that type 120, medium viscosity carboxymethyl cellulose, i. e. a medium viscosity CMC having an average number of 1.2 carboxymethyl groups substituted in each anhydroglucose unit of the cellulose molecule, was substituted for the high viscosity carboxymethyl cellulose material therein employed.

The resulting glycoprotein product was highly viscous and non-gelling at room temperature. However, the product flowed freely and could be drawn into a syringe through an 18 gauge needle, and readily extruded.

While in the foregoing specifications various embodiments of this invention have been set forth and specific details thereof elaborated for the purpose of illustration, it will be apparent to those skilled in the art that this invention is susceptible to other embodiments and that many of these specific details may be varied widely without departing from the basic concept and spirit of the invention.

I claim:

1. In a method of preparing a glycoprotein, the steps of combining a carboxymethyl cellulose and gelatin in aqueous solution at a pH of from 3.5 to 6.5, diluting said aqueous solution with water to precipitate a complex composed of a carboxymethyl cellulose component and a gelatin component, and separating the resulting precipitate from the aqueous solution.

2. The method of claim 1 in which the pH of said aqueous solution is from 4.5 to 5.5.

References Cited in the file of this patent

UNITED STATES PATENTS

| | | |
|---|---|---|
| 1,245,977 | Satow | Nov. 6, 1917 |
| 1,929,732 | Zeigler | Oct. 10, 1933 |
| 2,180,542 | Osgood | Nov. 21, 1939 |
| 2,458,504 | Chester et al. | Jan. 11, 1949 |

FOREIGN PATENTS

| | | |
|---|---|---|
| 410,649 | Great Britain | May 24, 1934 |

OTHER REFERENCES

Meyer et al.: Chem. Abstracts, vol. 31, col. 7074 (1937).

Micheel et al.: Chem. Abstracts, vol. 39, col. 5319 (1945).